United States Patent Office 3,579,511
Patented May 18, 1971

3,579,511
TRIAZOLE COMPOUNDS, PROCESSES FOR THEIR MANUFACTURE AND USE
Kurt Weber, Basel, Peter Liechti, Binningen, and Rudolf Meyer and Adolf Emil Siegrist, Basel, Switzerland, assignors to Ciba Limited, Basel, Switzerland
No Drawing. Filed Aug. 6, 1968, Ser. No. 750,465
Claims priority, application Switzerland, Aug. 16, 1967, 11,487/67
Int. Cl. C07d 55/02
U.S. Cl. 260—240     2 Claims

ABSTRACT OF THE DISCLOSURE

The invention comprises new triazole derivatives which are useful as optical brighteners—especially for detergents as well as cellulose and polyamide fibers—and which correspond to the formula

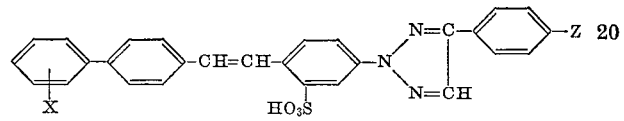

wherein Z represents hydrogen or a phenyl group and X signifies a sulphonic acid group or a hydrogen atom where Z represents a hydrogen atom, whilst if Z=phenyl the symbol X represents a sulphonic acid group, as well as their alkali or ammonium salts.

---

The present invention relates to new specifically substituted triazole compounds, processes for their manufacture and use.

The triazole compounds according to the invention correspond to the general formula (1)
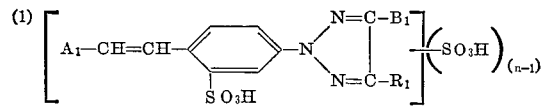

wherein one of the two residues $A_1$ and $B_1$ represents a 4-diphenylyl residue whilst the other denotes a phenyl residue, or both residues $A_1$ and $B_1$ represent a 4-diphenylyl residue and the optional sulphonic acid group marked with the index $(n-1)$ is located on one of the residues $A_1$ and $B_1$ and $n$ signfies the number 2 in the case where both $A_1$ and $B_1$ denote a 4-diphenylyl group and in other cases denotes the numbers 1 or 2, and $R_1$ represents hydrogen, a phenyl group or a methyl group.

The corresponding water-soluble salts (alkali salts, ammonium salts, amine salts and the like) are of course also to be regarded as falling within the above formula.

Compounds which are of preferred interest within the framework of the above formula are those of formula (2)
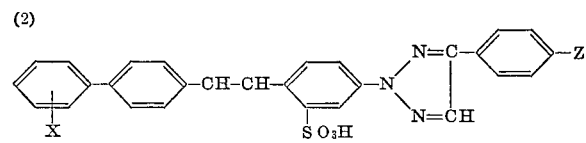

wherein Z represents hydrogen or a phenyl group and X signifies a sulphonic acid group or a hydrogen atom in the case where Z represents a hydrogen atom whilst where Z=phenyl the symbol X represents a sulphonic acid group.

As may be seen from the foregoing, the compounds according to the invention are characterised by the presence of at least one 4-diphenylyl ring system, with one sulphonic acid group being located on the phenylene nucleus which serves as the link between the ethylene double bonds and the triazole ring and optionally a second sulphonic acid group being located on a terminal phenyl nucleus according to Formulae 1 or 2.

The following compounds may be mentioned as examples of compounds of the above type:

(3)
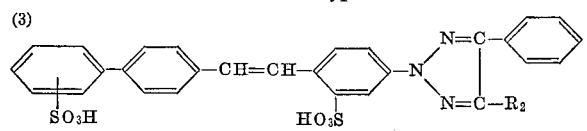

(4)

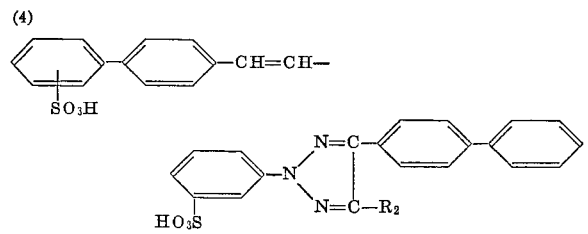

(5)
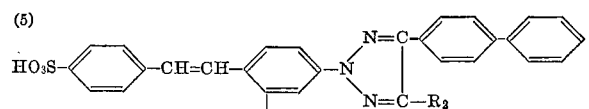

(6)
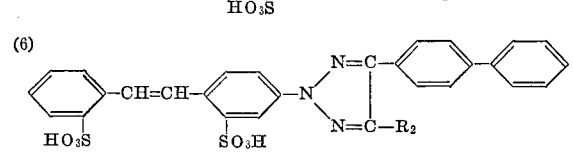

In these formulae $R_2$ represents hydrogen or a methyl group.

In addition to the free sulphonic acids, salts which are of practical interest are above all the water-soluble salts such as those of sodium, potassium and ammonium, but also amine salts (for example the diethanolamine salt).

The new triazole derivatives characterised above may be manufactured analogously to processes which are in themselves known. For example, a process which proves appropriate is the diazotisation of a 4-aminostilbene-2-sulphonic acid compound, reduction to the hydrazine derivative, condensation with a compound of the isonitroso-acetophenone type and dehydrating ring closure:

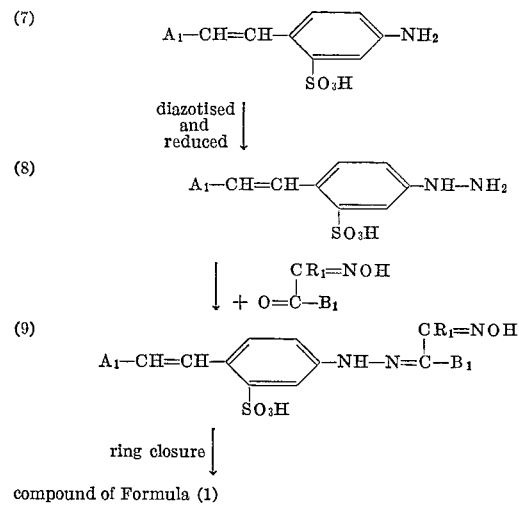

compound of Formula (1)

In this reaction scheme $A_1$, $B_1$ and $R_1$ have the same significance as given above with the presence of sulphonic acid groups according to the conditions of Formula 1 having to be taken into account in the appropriate sense.

The condensation of the hydrazinostilbene sulphonic acid with the compound of the isonitrosoacetophenone type is preferably effected in aqueous alcoholic solution, for example in a mixture of water and methanol at elevated temperature, for example at the boiling point of the mixture. The ring closure to give the triazole is effected with the aid of reagents which eliminate water, for example by heating in acetic anhydride.

The following aminostilbenesulphonic acids may for example be mentioned as starting substances for the manufacture of the new triazole compounds according to the invention:

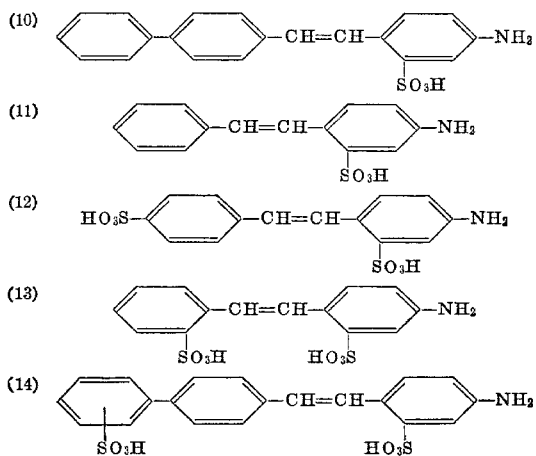

The compounds characterised above show a more or less pronounced fluorenscence in the dissolved or finely divided state. They may therefore appropriately be used, in the form of the free sulphonic acids or of water-soluble salts of the sulphonic acids, for the optical brightening of the most diverse organic materials of synthetic, semi-synthetic or natural origin in which optical brightening is desired. For example, the said triazole derivatives can be employed as optical brighteners for cellulose fibres and polyamide fibres by the exhaustion process.

The sulphonic acids, and their water-soluble salts, obtainable in accordance with the invention possess special advantages in respect of application technique, because of their affinity for fibres which is good in most cases, even in the presence of detergents, and their high light fastness and stability to conventional oxidising agents in bleaching baths. They therefore find preferential use as detergent brighteners.

The incorporation of the optical brighteners into the detergent substances can be effected in a manner which is in itself usual, for example by grinding, kneading or stirring with auxiliary materials and fillers and spraying in a spray dryer.

The following may be mentioned by way of example from amongst the multiplicity of detergents to which these brighteners may be added: soluble salts of higher fatty alcohol sulphonates, of sulphocarboxylic acid esters, especially of higher fatty alcohols, of alkyl-substituted arylsulphonic acids, of acylaminoalkyl-fatty acids, of fatty acid acyl-glycerine sulphates and numerous others.

The new triazole compounds may be incorporated in the most diverse detergents in amounts of 0.01 to 2% by weight; in general, 0.1 to 1% by weight is appropriate.

The detergents characterised by a content of the brighteners defined above may be employed for washing the most diverse fibre substrates such as for example cellulose fibres and polyamide fibres. The very good brightening effect on washing cotton fabrics, especially in the presence of the oxidising agents usual in wash liquids, such as for example sodium hypochlorite solution and trichlorisocyanuric acid, deserves special mention.

EXAMPLE 1

29.2 g. of 4-amino-4'-phenyl-stilbene-2-sulphonic acid are suspended, in a finely divided state, in 500 ml. of water at 15° C. 25 ml. of 36% strength hydrochloric acid and a solution of 7.6 g. of sodium nitrite in 50 ml. of water are then added and the whole is stirred for 20 hours at 15 to 25° C. After destroying the excess nitrite with a little sulphamic acid, 27 g. of sodium sulphite are added, the pH-value of the suspension is adjusted to a pH-value of 10 by adding a little concentrated sodium hydroxide solution and the mixture is stirred for 45 minutes at 20° C. The suspension is adjusted to a pH-value of 3 by means of 36% strength hydrochloric acid and is added dropwise over the course of 2½ hours, with very good stirring, to a boiling mixture of 50 g. of iron powder, 100 ml. of water and 20 g. of glacial acetic acid. The mixture is stirred for a further 2 hours at the boiling temperature, rendered alkaline by adding 36 g. of calcined soda, and clarified by filtration. The reddish-yellow solution is acidified with 150 ml. of 36% strength hydrochloric acid, heated to boiling and stirred for one hour at boiling temperature. The product which has crystallised out is filtered off after cooling and is washed with alcohol. Yield: about 18.5 g. (61.3% of theory) of the compounds of formula (15)

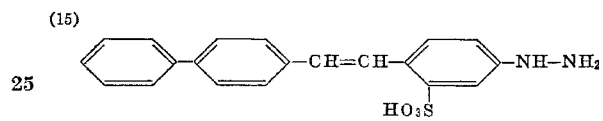

Yellow powder.

18.5 g. of 4-hydrazino-4'-phenyl-stilbene-2-sulphonic acid of Formula 15 are suspended in 400 ml. of water and 1 ml. of approximately 40% strength sodium bisulphite solution at 40° C. The mixture is adjusted to pH 10 by adding concentrated sodium hydroxide solution, whereupon the product dissolves. A solution of 9.1 g. of isonitrosoacetophenone in 120 ml. of methanol is added rapidly and the pH-value is adjusted to 4.5 by adding acetic acid. The brownish-red suspension is heated to boiling, stirred for 14 hours under reflux, cooled to 20° C., adjusted to a pH-value of 2 with 36% strength hydrochloric acid, and the product is filtered off, washed with 5% strength sodium chloride solution and dried in vacuo at 40° C.

Yield: about 27.5 g. of the compound of formula (16)

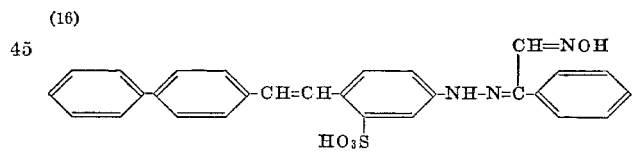

Brownish-red powder.

27.5 g. of this compound are heated in 350 ml. of acetic anhydride, 5 g. of anhydrous sodium acetate and 10 ml. of dimethylformamide to 104° C. over the course of 3 hours and stirred at this temperature for 8 hours. The mixture is then evaporated in vacuo, the residue is boiled up with 100 ml. of water, the product which has crystallised out is filtered off, dissolved in boiling dimethylformamide and evaporated to dryness, the residue is boiled up with 200 ml. of water and the product which has crystallised out is filtered off. The product is dissolved in 300 ml. of water and 300 ml. of dioxan at the boil, mixed with 14 ml. of 1 N sodium hydroxide solution, decolorised with about 10 ml. of sodium hypochlorite solution and allowed to crystallise out. Light yellow needles of the compound (17)

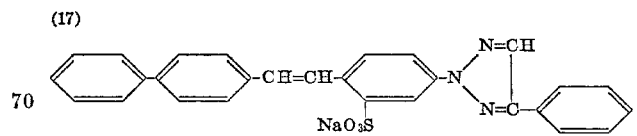

*Analysis.*—$C_{28}H_{20}N_3NaO_3S \cdot H_2O$. Calculated (percent): C, 64.73; H, 4.27; S, 6.17. Found (percent): C, 64.70; H, 4.39; S, 6.36.

EXAMPLE 2

Bleached cotton fabric is washed for 30 minutes, using a liquor ratio 1:30, in a liquor warmed to 60° C. which contains the following additives per litre: 0.032 g. of the brightener of Formula 17, 1 g. of active chlorine (sodium hypochlorite solution), and 4 g. of a detergent powder of the following composition: 15.00% of dodecylbenzene-sulphonate, 10.00% of sodium laurylsulphonate, 40.00% of sodium tripolyphosphate, 25.75% of calcined Glauber salt, 7.00% of sodium metasilicate, 2.00% of carboxymethylcellulose and 0.25% of ethylene diamine tetra-acetic acid. After rinsing and drying, the fabric shows a strong brightening effect of good fastness to light, acid and chlorine.

If instead of cotton material a nylon Helanca fabric is used and the washing process is carried out without the addition of sodium hypochlorite solution, a strong brightening effect is again obtained.

EXAMPLE 3

A polyamide fibre fabric (Perlon) is introduced at 60° C. using a liquor ratio of 1:40, into a bath which contains 0.3% of the brightener of Formula 17 (relative to the weight of fabric) as well as 1 g. of 80% strength acetic acid and 0.25 g. of an addition product of 30 to 35 mols of ethylene oxide to one mol of commercial stearyl alcohol per litre. The bath is warmed to boiling temperature over the course of 30 minutes and kept at the boil for 30 minutes. After rinsing and drying a strong brightening effect of good light fastness is obtained.

We claim:
1. A triazole compound of the formula

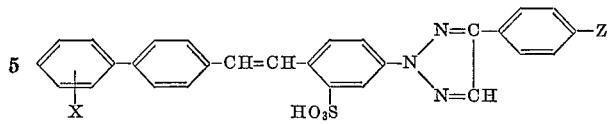

wherein Z represents hydrogen or a phenyl group and X signifies a sulphonic acid group or a hydrogen atom where Z represents a hydrogen atom, whilst if Z=phenyl the symbol X represents a sulphonic acid group, as well as their alkali or ammonium salts.

2. The compound according to claim 1 according to formula

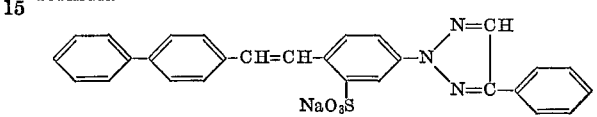

References Cited

UNITED STATES PATENTS 3,453,268  7/1969  Dorlars et al. _____ 260—240

FOREIGN PATENTS 1,508,550  11/1967  France _____ 260—240

JOHN D. RANDOLPH, Primary Examiner

U.S. Cl. X.R.

117—33.5; 252—137, 152, 301.2; 260—141, 508